US009208223B1

(12) United States Patent
Patil et al.

(10) Patent No.: US 9,208,223 B1
(45) Date of Patent: Dec. 8, 2015

(54) METHOD AND APPARATUS FOR INDEXING AND QUERYING KNOWLEDGE MODELS

(75) Inventors: Abhijit Ashok Patil, Alpharetta, GA (US); Sreenivasa Rao Pragada, Irvington, NY (US); Raju Venkata Rama Raju Gopala Gottumukkala, Cumming, GA (US); Kaliki Murthy Aritakula, Cumming, GA (US); Viswanath Dasari, Alpharetta, GA (US)

(73) Assignee: Semantifi, Inc., Stamford, CT (US)

( * ) Notice: Subject to any disclaimer, the term of this patent is extended or adjusted under 35 U.S.C. 154(b) by 0 days.

(21) Appl. No.: 13/210,409

(22) Filed: Aug. 16, 2011

Related U.S. Application Data

(60) Provisional application No. 61/374,595, filed on Aug. 17, 2010.

(51) Int. Cl.
*G06F 17/30* (2006.01)
(52) U.S. Cl.
CPC .................... *G06F 17/30731* (2013.01)
(58) Field of Classification Search
CPC .............. G06F 17/2785; G06F 17/278; G06F 17/30731
USPC ............... 707/741; 706/12; 704/1, 7
See application file for complete search history.

(56) References Cited

U.S. PATENT DOCUMENTS

| 2007/0073680 | A1* | 3/2007 | Kawamura et al. | 707/5 |
| 2009/0089277 | A1* | 4/2009 | Cheslow | 707/5 |
| 2010/0228693 | A1* | 9/2010 | Dawson et al. | 706/12 |

OTHER PUBLICATIONS

Kate Byrne; "Populating the Semantic Web-Combining Text and Relational Database as RDF Graphs", University of Edinburg, 2008; 257 pages.*
Aleman-Meza et al., "Ranking Complex Relationships on the Semantic Web", IEEE Internet Computing, vol. 9, issue 3, May/Jun. 2005.*

* cited by examiner

*Primary Examiner* — Monica Pyo
(74) *Attorney, Agent, or Firm* — Gordon Kessler

(57) ABSTRACT

A method and apparatus for indexing content. The method includes the steps of converting content to one or more context knowledge graphs, identifying one or more knowledgebase triples or entities from the one or more context knowledge graphs, for each knowledgebase triple or entity, identifying one or more knowledgebase variations thereof, and storing the one or more knowledgebase variations as a knowledgebase representation of the content in a reverse index to a non-volatile computer readable storage medium.

20 Claims, 6 Drawing Sheets

METHOD AND APPARATUS FOR INDEXING AND QUERYING KNOWLEDGE MODELS

CROSS REFERENCE TO RELATED APPLICATIONS

This application claims the benefit of U.S. Provisional Patent Application Ser. No. 61/374,595 filed 17 Aug. 2010 to Patil et al. titled "Method and Apparatus for Storing Ontologies in a Relational Database", the entire contents thereof being incorporated herein by reference.

FIELD OF THE INVENTION

Embodiments of this invention relate generally to the indexing and querying of knowledgebase, and more particularly to the indexing of various representations of portions of knowledgebase in a relational database to aid in querying of that knowledgebase.

BACKGROUND OF THE INVENTION

Knowledgebase refers to information about a data set, database or other accumulation of data. Such knowledgebase is in addition to the actual data included within the dataset or database, and may comprise information about the interrelationships between the various data elements. Each bit of information in a knowledgebase is typically indicated as being stored in ontological triples, and including two instances or concepts linked by a relation. By linking these "barbell" representations together, a knowledge graph representative of a knowledgebase may be generated consisting of a large graph which may be traversed when attempting to access information from the knowledgebase. Thus, triples are generated associated with one or more concepts in any number of documents or the like. These triples are connected to form the knowledgebase associated with these documents or the like.

In addition, a knowledge representation of each and every document or the like that makes up the knowledgebase is formed and stored. As can be seen, addition of further documents or the like increases the number of knowledgebase representations of those documents, and therefore increases time associated with searching through them.

Upon entry of a query by a user, a knowledge representation of that query is generated. Thereafter, that generated knowledge representation is compared to each of the knowledge representations of the documents or the like, comprising the knowledge graphs to determine if there are any matches. This may be a laborious task, requiring comparing the query knowledge representation with each and every knowledgebase representation of the documents or the like associated with the knowledgebase. Additionally, as data is added to the knowledgebase, additional search time at run time is required.

Therefore, it would be desirable to provide a method and apparatus that overcomes these noted drawbacks of the prior art and allows for the easy and quick querying of knowledgebase by a user query.

SUMMARY OF THE INVENTION

Therefore, in accordance with one or more embodiments of the invention, a method and apparatus for indexing content may be provided. The method may comprise the steps of converting content to one or more context knowledge graphs and identifying one or more knowledgebase triples or entities from the one or more context knowledge graphs. Then, for each knowledgebase triple or entity, identifying one or more knowledgebase variations thereof, and storing the one or more knowledgebase variations as a knowledgebase representation of the content in a reverse index to a non-volatile computer readable storage medium. In accordance with various embodiments of the invention, by determining all such variations associated with the content, and employing similar steps to determine such variations of information contained in a user query in advance, semantic search becomes no more than a simple look up and matching exercise Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
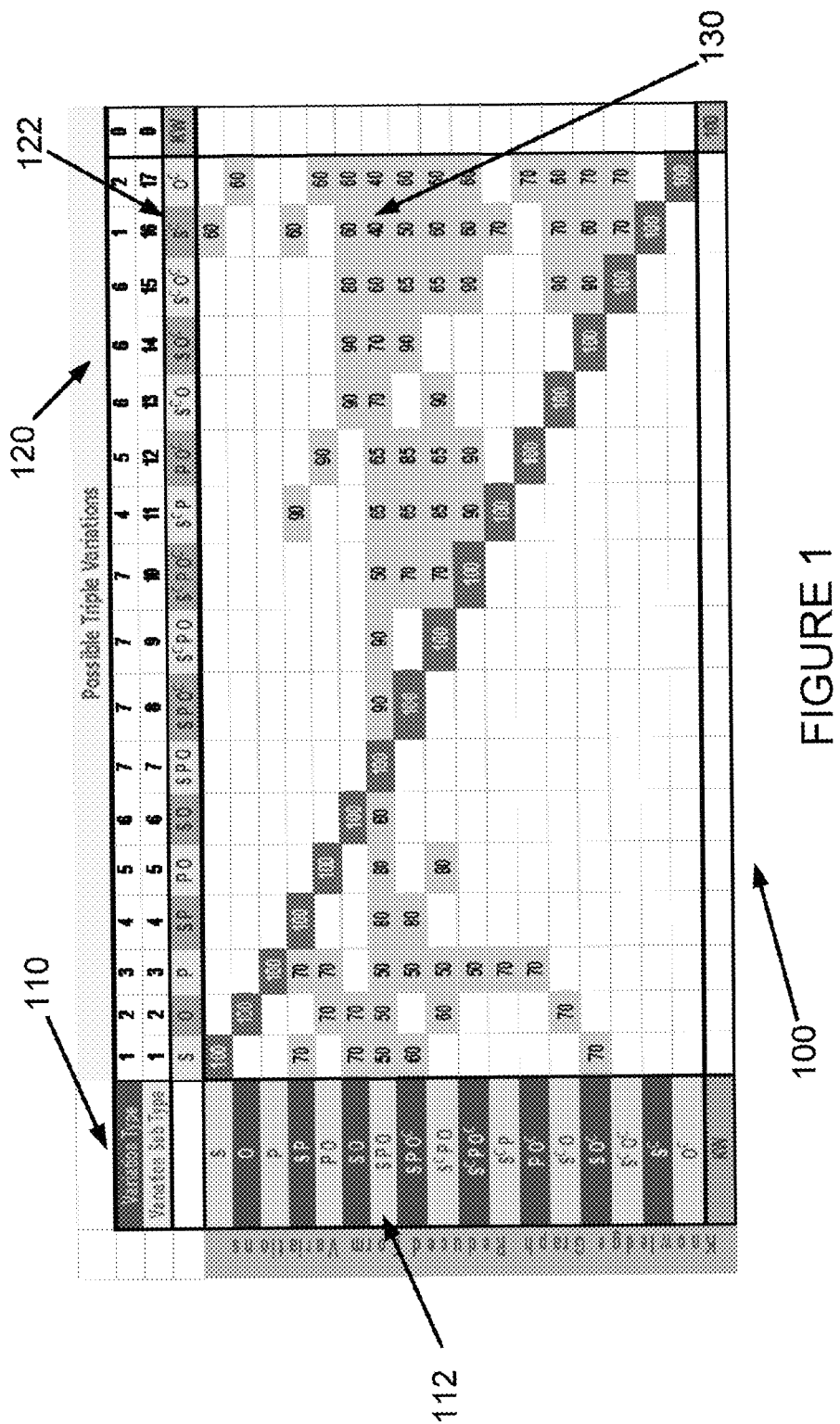
FIG. 1 shows a variations table indicative of possible variations of one or more ontological triples in accordance with an embodiment of the invention.

The invention will now be described, making reference to the following drawings in which like reference numbers depict similar structure.

A knowledge graph is preferably made of connected and un-connected entities. These entities may be of two types, Concepts and Instances. An Instance is a specific interpretation of a Concept, this means it can be represented by its abstraction i.e. Concept with a low degree of confidence or relevance. A simplest way of capturing connected information in a knowledge graph is using basic sentence structure i.e. SUBJECT-PREDICATE-OBJECT. In ontology terms, it is also called as a Triple. A Triple has two end-points, subject and object and both are regular knowledge entities i.e. either Concept or Instance. This gives us four variations of triples. A predicate means a relation between these entities.

Instance-Relation-Instance (IRI)
Instance-Relation-Concept (IRC)
Concept-Relation-Instance (CRI)
Concept-Relation-Concept (CRC)

Anytime an instance is included in such a relationship, it is also possible to provide a representation of the instance according to the concept to which the instance relates. This means, an IRI triple also provides the remaining three variations. Similarly, IRC and CRI triples provide a variation thereof in the form of CRC. This is because each Instance is a specific instance of a particular concept. Thus, when provided with an instance, a concept corresponding to that instance may also be considered a variation of the instance.

In accordance with an embodiment of the invention, consider the following six content pages (numbers 1-6), and their associated knowledge graphs as shown in Table 1.

TABLE 1

| | Content | Graph |
|---|---|---|
| 1 | James Cameron directed Titanic | Titanic - has-director - James-Cameron |
| 2 | LeonardoDicaprio acted in Titanic. Titanic is directed and produced by James Cameron. | Leonardo-Dicaprio - stars-in - Titanic<br>Titanic - has-director - James-Cameron<br>Titanic - has-producer - James-Cameron<br>Titanic - has-director - James-Cameron |
| 3 | James Cameron also directed Avatar | Avatar - has-director - James-Cameron |
| 4 | Avatar was shot in IMAX 3D | Avatar - has-film-format - IMAX-3D |
| 5 | James Cameron is a director | Movie - has-director - James-Cameron |
| 6 | Movies are directed by directors and actors act in movies | Movie - has-director - Director<br>Actor - stars-in - Movie |

Consider a user query asking about the "Director of Avatar?" A knowledge graph of this query may be represented as: "Avatar—has-director—Director", where the indication of the concept "Director" indicates that the query is looking for a specific instance of the "Director" concept related to the instance "Avatar" through the relationship "Has Director." In order to find this information and provide a relevant search result, it will be necessary for the search algorithm to reach content page 3 of Table 1. In order to perform such a search, traditionally, a search engine would have to infer at runtime the following:

1. That James Cameron is a director.
2. The question asked is about the movie Avatar.
3. If there exists a triple that links James Cameron and Avatar by a relationship including "Director", the content page corresponding to this triple may be provided as a response in a search result.

As noted above, content page 3 meets all of these criteria. Performing all of these steps at runtime may take a long period of time.

Therefore, in accordance with one or more embodiments of the invention, a simple way to perform such a search would be able to be able to look up this information quickly and get the search result without having to make any of the above inferences at runtime. This can be achieved in accordance with embodiments of the present invention by creating variations in accordance with the above description ahead of time, and storing these variations along with the generated triple. Thus, content page 3 may be represented according to the following variations in Table 3, employing the four triple variations described above.

TABLE 3

James Cameron also directed Avatar
Avatar - has-director - James-Cameron
Movie - has-director - James-Cameron
Avatar - has-director - Director
Movie - has-director - Director With this information available in accordance with the knowledge graphs associated with content page 3, no inferences during runtime are necessary. Rather, producing content page 3 as a potential search result merely requires generating the knowledge representation of the user query, and, looking through all of the generated content related triple variations, and selecting one or more pages corresponding to the matched triples.

The inventors of the present invention have further discovered that providing the above noted variations at of the knowledge representation triples corresponding to the content pages may not be sufficient. Thus, additionally, such triples variations may be provided in accordance with the user query knowledge graph. In accordance with this embodiment of the invention the triple "Movie—has-director—Director" variation of the "Avatar—has-director—Director" knowledge representation of the user query may also be provided. Thus, in case of the above query, in addition to returning content page 3, content pages 5 and 6 may also be provided as they will have "Movie—has-director—Director" variation which is also a variation of user query, as will be described below. The invention also includes one or more methods for selecting a best response document from among a number of such possible response documents. Generating such an expanded triples index allows substantially more flexibility, thus supporting querying with substantial speed. Any question that can be asked, such as "list all movies and their directors", would take a simple lookup to get all the results.

In accordance with embodiments of the present invention, when these variations are created, they are preferably provided one or more specific identifiers for easier use. At a high level, based upon which portions of a triple are present, there may be up to 8 variations (3 components, each present or absent, simple truth table gives 8 variations). These variations are preferably labeled 0 to 7, where label seven means all components i.e. full triple exists, labels 6-4 represent a situation where two of the three elements of the triplet are present, and labels 3-1 represent when only one element of the triple is present. A 0 means none of the component of a triple exists, a variation that does not represent semantic information. Thus there are 7 useful semantic variations.

Similarly, the inventors of the present invention have determined that additional variations may also be defined due to abstraction of knowledge. An instance can be abstracted to concept to give us concept level variations, in the manner noted above. This means each one of seven variations from earlier aspect have further variations due to their end points being concepts or instances, providing a total of 17 different variations. These variations each represent different information at different levels of abstraction. Therefore, once these 17 different variations are provided, they can be used as the different knowledge level representations associated with each of the content and/or query, thus making the look up described above easy, fast and comprehensive, thus providing wide semantic coverage.

Referring next to FIG. 1, a variation table 100 is shown that depicts each of these possible 17 variations, and presents how relevant each variation is as compared to the original information from which it is formed. Such a variation table 100 shows variations in knowledge as they appear in either content or a user query. Column 110 depicts the 17 variations of the information that may serve as the original information, while row 120 depicts all possible variations thereof. Blanks show that the particular variation is not available corresponding to the particular form of original information, while a number (0-100) represents a weight given to that particular variation relative to the original information, (where S stands for Subject or source or start, P for predicate or relation or connecting element and O for object or destination or endpoint, also superscript "C" stands for concept level variation of these elements i.e. without superscript they depict instances. Again a relation i.e. predicate or P doesn't have these variations). For example, if the original information is full instance-triple (depicted by row SPO (subject, predicate, object) 112 in FIG. 1) and variation being matched is just the starting concept (meaning that only the first of the three triple elements is present, and that first element is a concept level element, represented by column $S^c$ 122 alone in FIG. 1) then it is quite removed from the actual information being specified in the content and hence is considered to be far less relevant than other information that may be presented (in FIG. 1 this is evident by the cross-section cell 130 with weight 40). Obviously this kind of relevance is purely dependent on the application and hence the actual weight values being used can vary based on each application and have to be determined by domain experts.

In accordance with one or more embodiments of the present invention, universal Search preferably consists of two distinct steps; the first is creating variations of the knowledge graph (as described above) and the second is actual matching between one or more of the knowledge graphs associated with content and that associated with a user query. A matching algorithm presented in accordance with one or more embodiments of the present invention is considered to be Universal in nature, meaning that the algorithm can match semantically as well as based on keywords. Semantic matching is far more detailed than simple keyword matching in that, as described above, not only can it be used to match complete triples, but also match partially recognized triples and individual knowledge entities. Additionally matching is not limited to constructs of same type from content and user query (i.e. triple to triple, entity to entity etc.) The inventive matching algorithm has the capability of matching a knowledge entity to a triple, partial triple to triple and so on each with a different relevance as it understands the difference between full match and partial match, according to, by example, the table of FIG. 1. The algorithm can also match concept level variation to instance level variations and vice versa with respective relevance weights. Considering the coverage of matching from keyword to full triple (semantic), concepts to instances and all the combinations in between, it can be easily viewed as Universal Content Matching algorithm.

To achieve scalability and coverage similar to the inventive method and apparatus using traditional semantic matching approaches such as RDQL, a far more complex process of inferencing and reasoning is preferably followed. The inventive method and apparatus reduces effort using the variation logic described above, effectively making actual search almost a lookup exercise. This allows the inventive method and apparatus to deliver consistent performance nearly irrespective of size of content knowledge, thus providing a very scalable approach.

Keyword search can be addressed very easily with the inventive universal match algorithm described above. As seen earlier, there are 8 variations based on components of triple being present or absent. Seven of them are semantic variations, means they give us some semantic information of the content they are representing, however one of the variations has all components absent i.e. variation 0 giving us no semantic information. This variation represents the keyword search variation in that knowledgebase can provide no additional information. A keyword is specified with this variation and can be matched to another keyword based on variation number. Usually when a semantic variation from content is matched to semantic variation from user query, a certain weight or relevance value is assigned based upon match confidence, as shown in FIG. 1. More triples and variations match to give a cumulative match confidence or match weight. However when a keyword matches with another keyword, as information is not semantic, a very small fractional amount of weight may be added to the total match weight.

Although, as seen above, querying in accordance with one or more embodiments of the present invention may be provided as a simple lookup, when one or more content documents are determined to be relevant to answering a particular query, it is desirable to provide those responses in order of relevance. Therefore, a weighted relevance value for each potential content document response would be valuable, and may be provided in accordance with embodiments of the invention. Thus, for example according to the above example, if a query comprises "Movies directed and produced by James Cameron", then we would want to see the content pages of Table 1 presented in order as 2, 1 and 3, 5, 6. This can be achieved by making sure that pages with more information come first. This can be achieved by providing a value to measure the number and value number of triples getting matched. It may also be possible to consider levels of match. In this example the query includes a CRI triple whereas page 6 only has a CRC triple making it less relevant compared to other pages, thus again employing the weighting table of FIG. 1.

Figure 2:
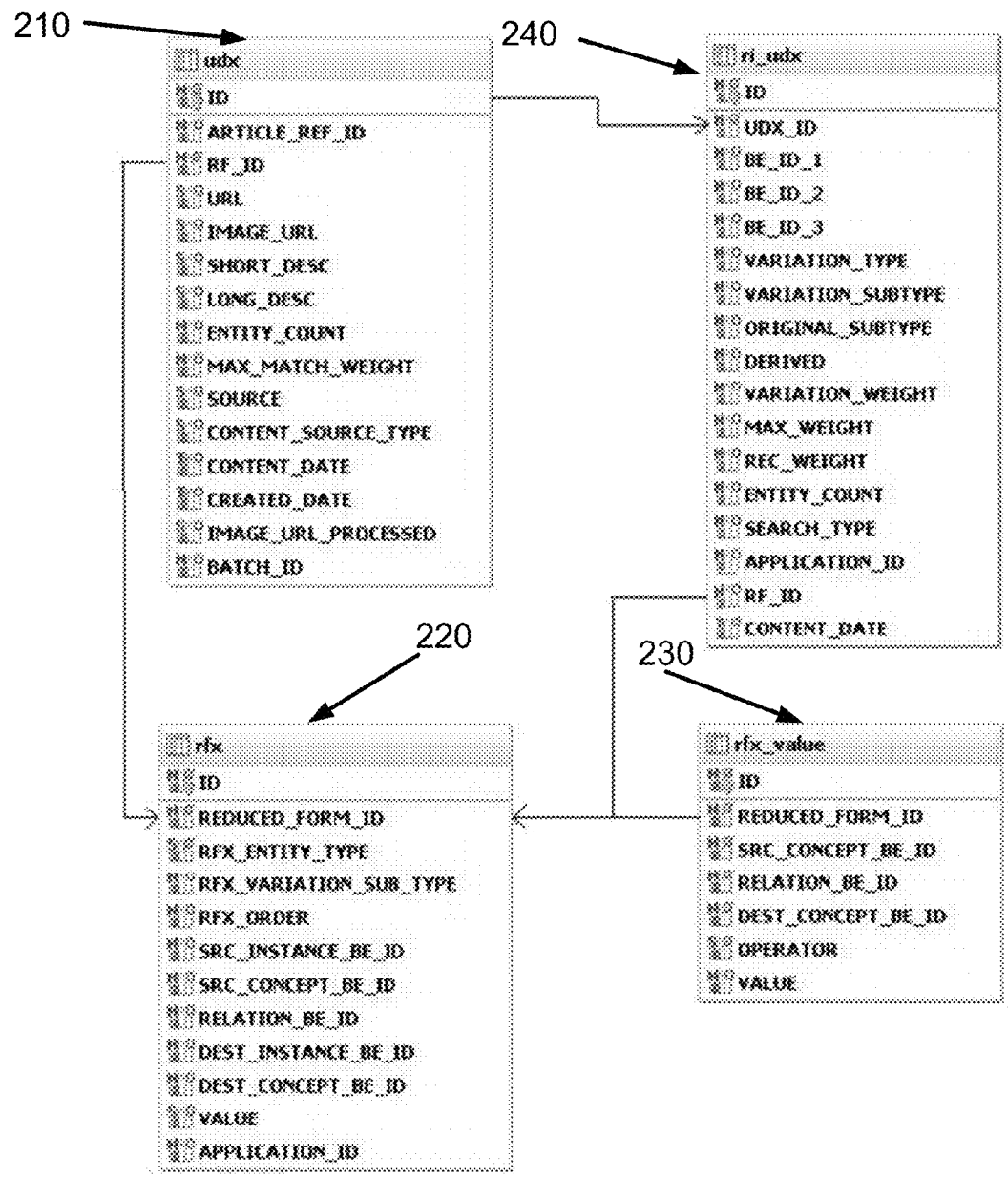
FIG. 2 is a block diagram depicting the various relationships between different elements of an ontological storage scheme representing content in accordance with various embodiments of the present invention.

Referring next to FIG. 2 tables used to store content information are shown. UDX or unstructured-index table 210 stores information about the content, such as its URL, source of the content, when the content was created, images specific information, long and short descriptions for the content, number of entities in it etc. Table 220 called RFX stores the actual knowledge graphs (as described above) for the content in triples form with internal identifiers for source, relation and destination instance as well as concepts. It may also store the order in which triples appear in graph and a unique id to identify the particular knowledge graph. A supplementary table 230 called RFX-VALUE stores the operator and value information present in content graph, which means it contains only the triples for which such information exists. To access all this information in an efficient way a reverse index 240 is created on top of this information captured by table called RI-UDX where RI stands for reverse index. Some of the additional columns in this RI-UDX that are not part of the other tables are explained in table 5.

TABLE 5

| Column | Description |
|---|---|
| Variation-Type | Variation type specified by an ID. For example, a triple may be represented by ID 7 and a single source entity by 1. This variation does not account for Concept-Instance variation and has values from 0 to 7, 0 being used for keywords. |
| Variation-Subtype | Specifies subtype of the variation based on Concept-Instance variations. As noted, there are total 17 variations for semantic information and one for keyword, so values from 0 to 17 are available, as shown in FIG. 1. |
| Original-Subtype | As discussed earlier, for matching purpose, variations based on original information are created as shown in FIG. 1. This column maintains the original variation subtype. |
| Derived | This specifies if this row contains original information or derived variations. |

TABLE 5-continued

| Column | Description |
| --- | --- |
| Variation-Weight | Weight of this variation based on FIG. 1. |
| Max-Weight | Maximum weight this variation can have, based on entities participating therein. |
| Rec-Weight | Actual recognition weight for that triple or entity based on recognition weights of entities therein. |
| Search-Type | As there are so many different variations, user has ability to choose to search just on Triples, which will be more semantic or just on entities which is less semantic as it doesn't consider relations or keyword search, if just keywords are used. This columns allows to select rows only required for specific type of search in order to reduce the processing time |

Figure 3:
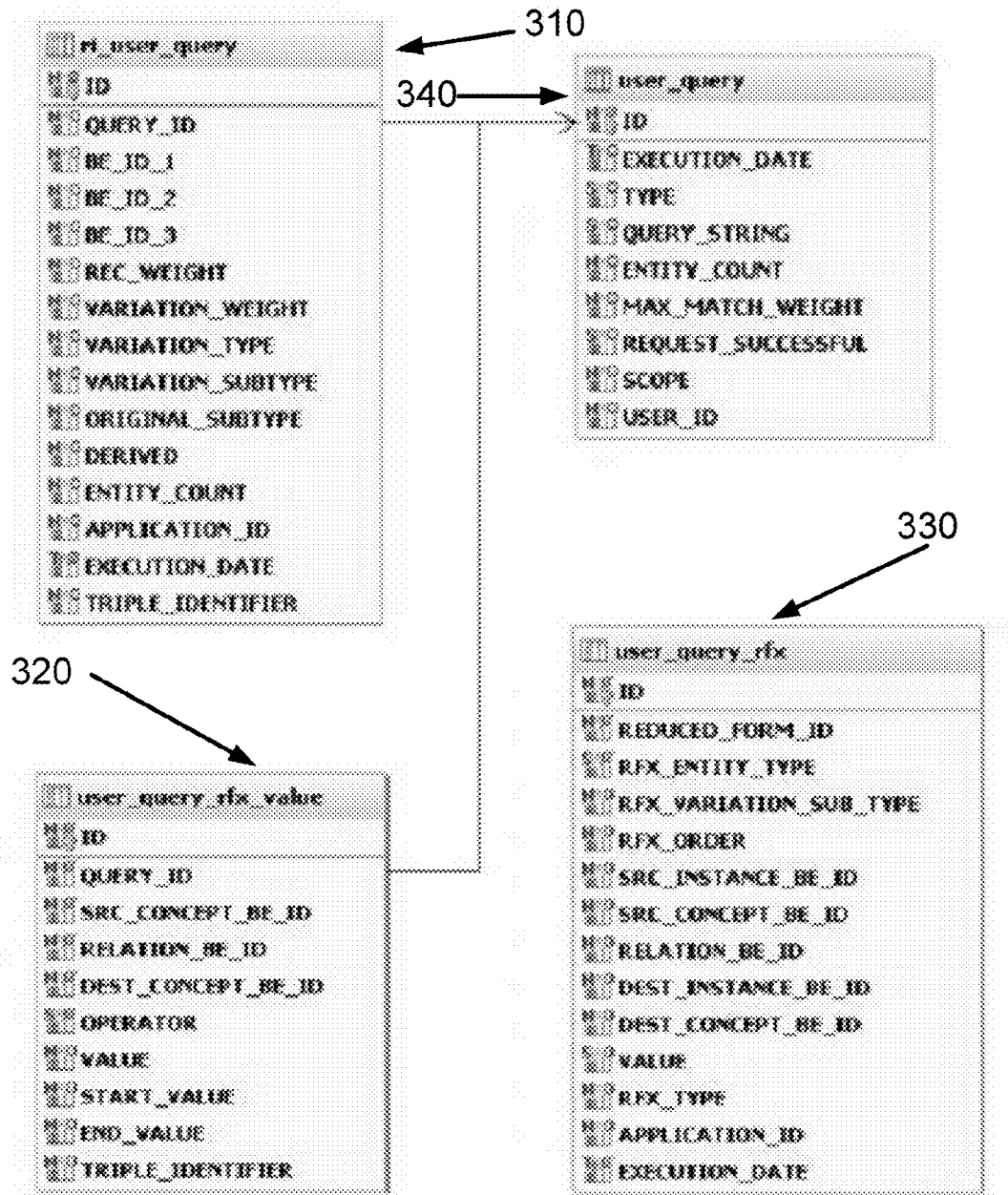
FIG. 3 is a block diagram depicting the various relationships between different elements of a knowledgebase representation of a user query in accordance with an embodiment of the invention.

Similar information related to the user query is also stored in tables depicted by FIG. 3. These tables are USER-QUERY (counterpart of UDX) 310, USER-QUERY-RFX 320, USER-QUERY-RFX-VALUE 330 (counterparts of RFX and RFX-VALUE) and RI-USER-QUERY 340 (similar to RI-UDX).

Querying various content information is achieved based primarily on two tables i.e. index on Content Knowledge Graph i.e. RI-UDX and index on user query knowledge graph i.e. RI-USER-QUERY. (RI stands for reverse index and UDX for Unstructured Data Index).

In the following table representation of a user query shown in Table 6, one can notice variation-weight column being used from both content and user query tables, and being indicated as "match weight." This variation-weight column is populated based on a Ranking-Weight table described further below. This table specifies how relevant a particular variation is with respect to original information. Information may be matched strictly for a specific variation subtype and grouped by specific reduced form to make sure information being matched is for a single content source. A number of triples being matched are also counted in order to understand scope of the match. This way even if two content sources with same matching weight is found, then one with more relevant information (i.e. less number of triples, but more weight means each triple is more relevant) may be selected.

TABLE 6

```
SELECT
        ru.UDX_ID,
        ru.RF_ID,
        rq.QUERY_ID,
        SUM(ru.MAX_WEIGHT      *      ru.VARIATION_WEIGHT      *
        rq.VARIATION_WEIGHT) AS Match_Weight,
        ru.ENTITY_COUNT,
        ru.SEARCH_TYPE,
        ru.APPLICATION_ID,
        GROUP_CONCAT(DISTINCT rq.TRIPLE_IDENTIFIER ORDER
        BY rq.TRIPLE_IDENTIFIER) AS matched_triple_ids,
        COUNT(DISTINCT rq.TRIPLE_IDENTIFIER) AS matchedSum
FROM
        RI_UDX ru, RI_USER_QUERY rq
WHERE
        rq.QUERY_ID                       = ?
        AND      rq.BE_ID_1               = ru.BE_ID_1.
        AND      rq.BE_ID_2               = ru.BE_ID_2.
        AND      rq.BE_ID_3               = ru.BE_ID_3.
        AND      rq.VARIATION_SUBTYPE     =
        ru.VARIATION_SUBTYPE
        AND    rq.DERIVED * ru.DERIVED    = 0
        AND      rq.APPLICATION_ID        = ru.APPLICATION_ID
GROUP BY
        ru.RF_ID ,
        ru.UDX_ID,
        ru.CONTENT_DATE
ORDER BY
        SUM(ru.MAX_WEIGHT      *      ru.VARIATION_WEIGHT      *
        rq.VARIATION_WEIGHT) DESC,
        SUM(ru.REC_WEIGHT         *         rq.REC_WEIGHT     *
        ru.VARIATION_WEIGHT * rq.VARIATION_WEIGHT) DESC,
        matchedSum DESC,
        ru.CONTENT_DATE DESC,
        (ru.ENTITY_COUNT/rq.ENTITY_COUNT),
        ru.UDX_ID DESC
```

A difficult situation may arise in a query with a user wishes to search for a value within a range of values, such as with the use of an operator. Operators allows questions to be asked, such as "<1000$", "<20000 miles" etc. As operators do not look for exact values, it is not possible to answer queries such as these using regular keyword based lookup search. Dynamically answering such questions is possible in accordance with various embodiments of the present invention. In order to answer such questions, preferably a separate index may be generated, and which may be combined with the content index described above, or may be used separately.

Operators and values by themselves do not convey any meaning unless they are connected to a knowledge entity. For example, "sale price <1000$" or "mileage <20000 miles". This means all the operators and values are associated with one of the entities from content. The inventive system may store all primitive data-types also as knowledge entities, including Currency and Distance in above examples, operators and values generally give us triples, with operator-value as instance of concept representing the data-type, i.e. in above example, "<1000$" becomes instance of Currency giving us triple as "Sale-Price—has-value—Currency(<1000$)".

Both the pages to be searched as well as a user query may use this semantic-operator-index. However, the actual storage may differ slightly for each. In the case of search-content, operator and value may be stored as two separate columns. Operator is preferably stored as presented, but value may be changed slightly based upon the included operator and the entity to which this operator-value is connected. For example, as currency can be in cents, <1000$ may be saved as < in operator column and 999.99 in value column. This may be desirable because when this information is queried, as the operator will not be used in the query. While storing the operator-value information, if a range is to be stored, the range is preferably split into a "<" and ">" combination, and is stored on two rows of the table, the two rows combining to make us the triple.

In case of user query, however, based on operator and entity it is connected to, a range is preferably calculated for the operator value combination. For example, in above examples, as we know sales-price cannot be less than zero, "<1000$" gives us range of "0-1000". The information is therefore preferably stored with a start-value (lower-limit) and an end-value (upper-limit). Alternatively, if the user query specifies the complete range, then this range may be used rather than the "cannot be less than zero" idea to set the bottom limit of the range. While querying, we simply get those search-content entries where for a triple, the value from search content falls between the ranges that user query indicates.

TABLE 7

Value match query

SELECT
    rv.REDUCED_FORM_ID, COUNT (DISTINCT uqrv.id)
    AS count,
    SUM (DISTINCT uqrv.TRIPLE_IDENTIFIER) as matched_Sum,
    group_concat(DISTINCT uqrv.TRIPLE_IDENTIFIER ORDER
    BY uqrv.TRIPLE_IDENTIFIER) as triple
FROM
    RFX_Value rv, USER_QUERY_RFX_VALUE uqrv
WHERE
    uqrv.QUERY_ID =: userQueryid
    AND uqrv.SRC_CONCEPT_BE_ID =
    rv.SRC_CONCEPT_BE_ID
    AND uqrv.RELATION_BE_ID = rv.RELATION_BE_ID
    AND uqrv.DEST_CONCEPT_BE_ID =
    rv.DEST_CONCEPT_BE_ID
    AND rv.value BETWEEN uqrv.START_VALUE AND
    uqrv.END_VALUE
GROUP BY
    rv.REDUCED_FORM_ID Table 7 specifies an example of a stored user query used for retrieving information effectively based on operators and values from user query. As described above, this query can be combined with a general semantic search query or be used separately. In this example, use of such a table will be considered as used separately. As can be seen in where conditions of this query, triples are matched based on source concept, relation and destination concept (see under "WHERE" label) between USER-QUERY-RFX-VALUE and RFX-VALUE ("FROM" label) table for UDX. The most important "WHERE" condition on value is checking if the value from content i.e. RFX-VALUE table falls in the range expected by the user query. This information is grouped by reduced form id (this is an internal id given to knowledge graph) in order to find out all the matched value conditions for that content graph.

While matching the query content to the page content, one or more rules as described in U.S. Provisional Patent Application Ser. No. 61/374,596 filed Aug. 17, 2010 titled Universal Ranking Mechanism: Method for Ranking Search Results with or Without Knowledge Base for Structured or Unstructured Content, and U.S. patent application Ser. No. 13/210,402 filed Aug. 16, 2001 to Pragada et al. titled Universal Ranking Mechanism: Method for Ranking Search Results with or Without Knowledge Base for Structured or Unstructured Content may be employed, the entire contents of these applications being incorporated herein by reference.

Figure 4:
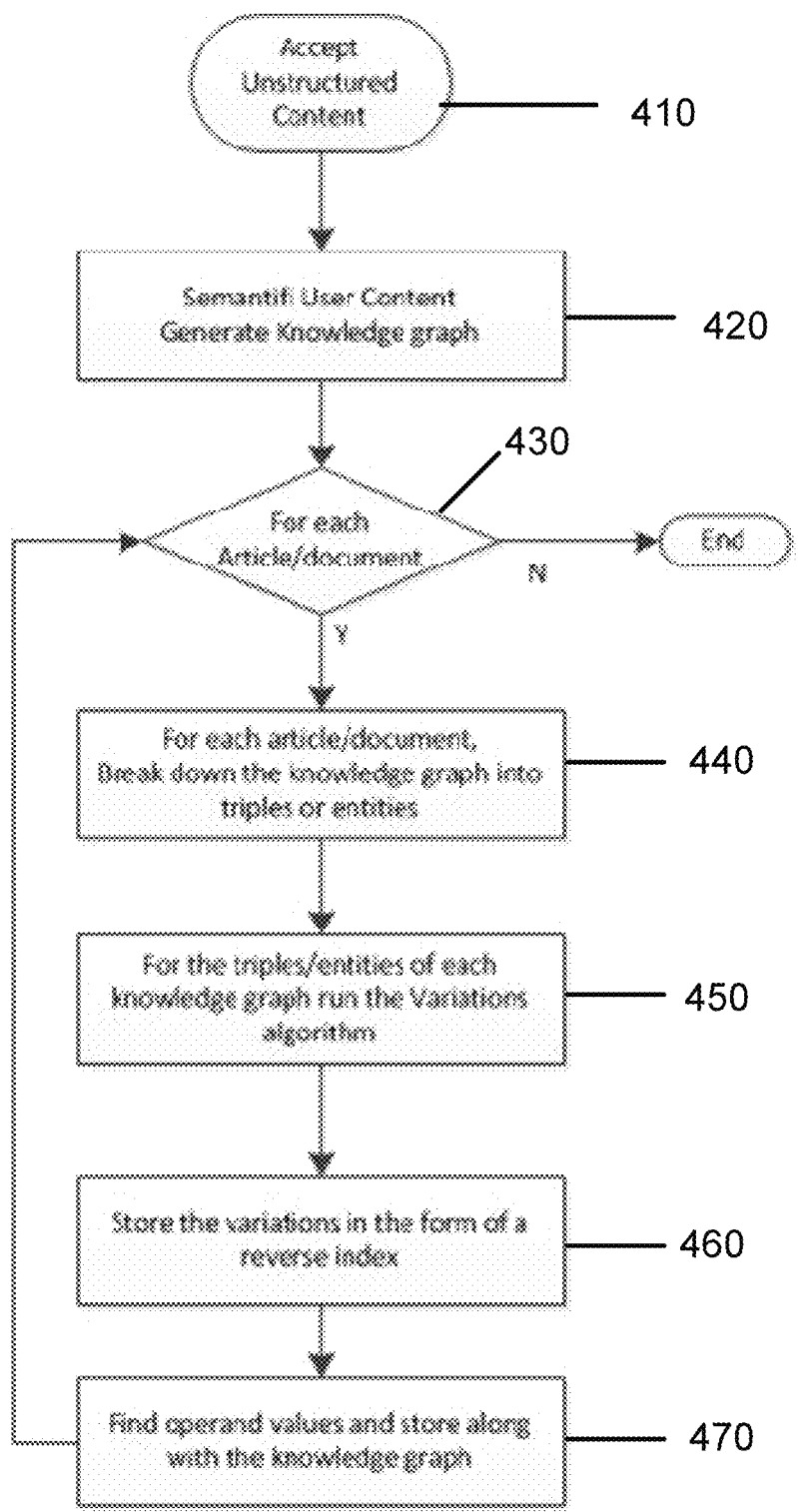
FIG. 4 is a block diagram depicting a method for storing a knowledgebase representation of one or more content documents in accordance with an embodiment of the invention.

FIG. 4 depicts a process flow for properly classifying content information according to the principles noted above. In particular, at step 410 unstructured content is accepted, and at step 420 a knowledge graph is generated for the user query, including various triples variations in the manner as described above. Next, at step 430, each article or document is considered. At step 440, for each article or document, a knowledge graph is formed in the manner noted above, and that knowledge graph is broken down into various triples or entities. At step 450, variations of each of the determined various triples are determined, and at step 460, these variations and triples are stored in a reverse index of the type described above. Finally, in the manner noted above, at step 470, one or more operand values may be determined and stored along with the knowledge graph.

Figure 5:
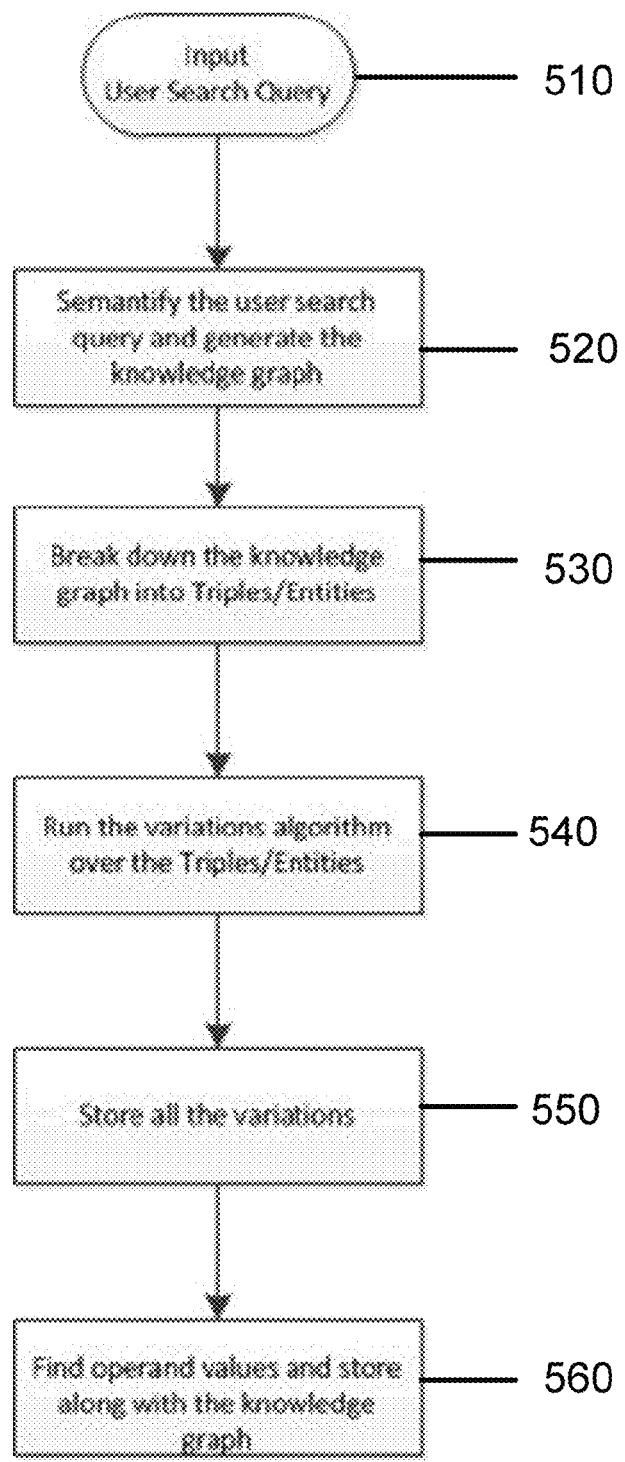
FIG. 5 is a block diagram depicting a method for storing a knowledgebase representation of one or more user queries in accordance with an embodiment of the invention.

FIG. 5 depicts a similar process for interpreting a user search query. As is shown in FIG. 4, at step 510 a user search query is input. At step 520 a knowledge graph is generated for the user search query in a manner noted above, and at step 530 the user query is broken down into triples and entities. Next, at step 540, in a manner similar to that described above variations of each of the triples and entities are determined and at step 550 are stored. Finally, one or more operand values may be determined and stored along with the knowledge graph at step 560, as described above.

Figure 6:
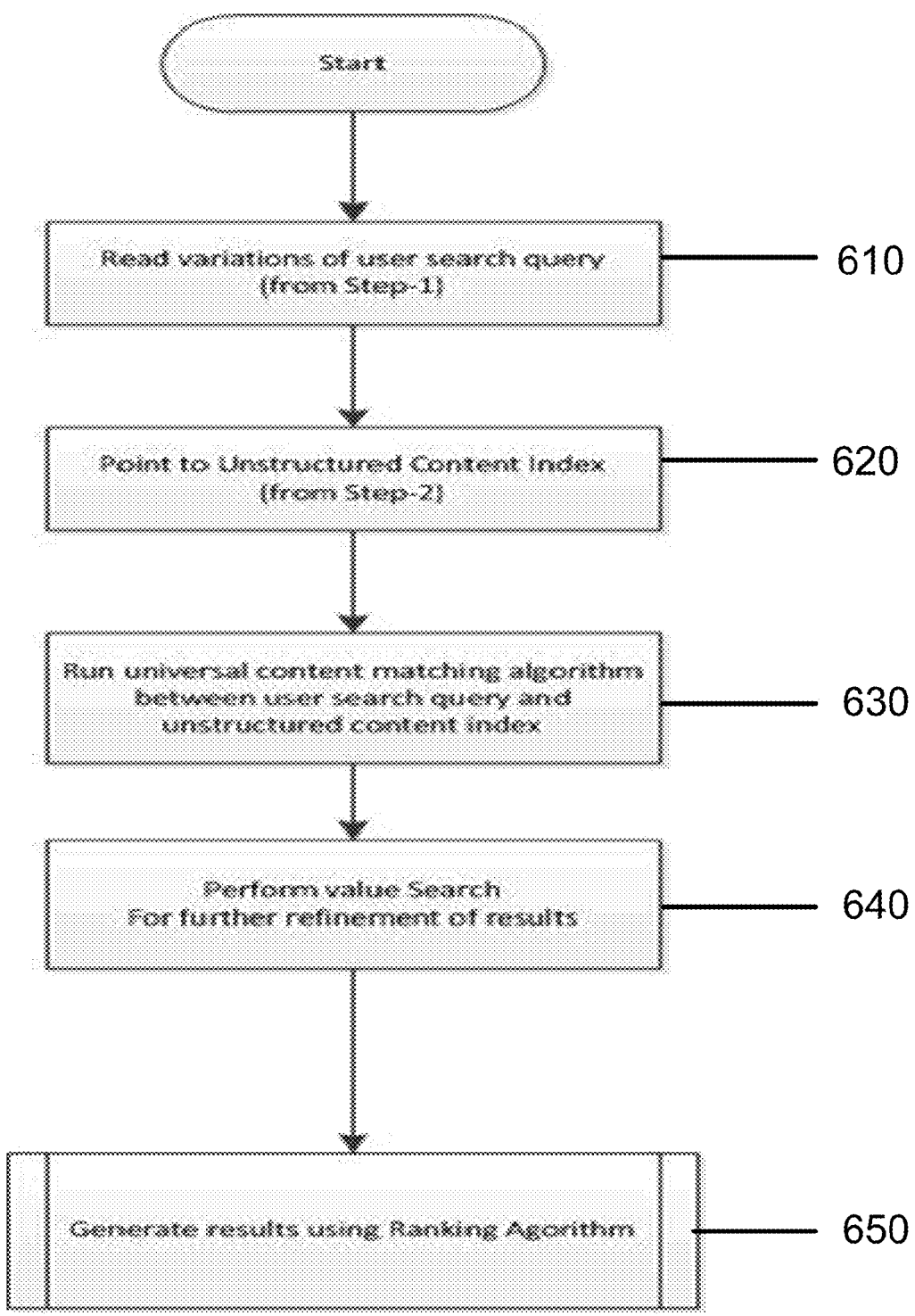
FIG. 6 is a block diagram depicting a search being performed using the results generated in FIGS. 4 and 5 in accordance with an embodiment of the invention.

FIG. 6 depicts a search being performed using the results generated in FIGS. 4 and 5 in accordance with an embodiment of the invention. As is shown in FIG. 6, at step 610, user search query variations, generated in accordance with the process of FIG. 3, are obtained. Then, at step 620, the unstructured content index generated in accordance with the steps of FIG. 4 is obtained, and a content matching algorithm is performed at step 630 to match the content from the user search query variations, and the content index in a manner as described above. At step 640, a value search is performed in accordance with one or more operators, as necessary. Finally, at step 650 results are ranked in accordance with various accumulated weighting values as described above.

The invention may be preferably implemented on a multi-purpose general computer system, having local or remote (i.e. cloud) storage, processing or the like, and may be presented to one or more users over a local network, or over the world wide web or other widely available network. The computer system may be provided with one or more components to implement the various embodiments of the invention, including processors, storage, communication devices, input and output apparatuses, displays and the like. The system may further include one or more mobile components, allowing for access or processing in accordance with one or more well known mobile communication protocols.

Therefore, in accordance with one or more embodiments of the present invention, an improved indexing and searching system may be provided for searching content with a user query. By exploring semantic meaning in the information and query, a substantial improvement in quality and speed of search can be provided over traditional keyword searches.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for indexing and searching content, comprising the steps of:
    converting content to one or more context knowledge graphs;
    creating a plurality of knowledgebase triples or entities selected from a group of Instance-Relation-Instance, Instance-Relation-Concept, Concept-Relation-Instance and Concept-Relation-Concept from the one or more context knowledge graphs;
    for each knowledgebase triple or entity, creating one or more knowledgebase variations thereof selected from the group of having from zero to three elements of the knowledgebase triple present, and including one or more endpoints as concepts or instances;
    storing the one or more knowledgebase variations as a knowledgebase representation of the content in a reverse index to a non-volatile computer readable storage medium;
    receiving a user search query;
    providing a weighting corresponding to a relevance between the user search query and one or more of the knowledgebase variations; and
    determining one or more elements of content to best respond to the user search query in accordance with the one or more weightings of the knowledgebase variations.

2. The method of claim 1, wherein the content is a structured dataset.

3. The method of claim 1, wherein the content comprises unstructured content.

4. The method of claim 1, wherein the step of creating the plurality of knowledgebase triples further comprises the step of identifying at least one incomplete triple.

5. The method of claim 1, wherein the step of creating the plurality of knowledgebase triples further comprises the step of identifying at least one entity.

6. The method of claim 1, wherein the step of creating the plurality of knowledgebase variations for a particular one of the plurality of knowledgebase triples further comprises the step of defining one or more combinations of knowledge entities comprising the particular one of the plurality of knowledgebase triples, each knowledge entity comprising one of an instance, a concept and a relation.

7. The method of claim 6, further comprising the steps of:
    for each combination of knowledge entities comprising an instance, abstracting one or more conceptual entities corresponding thereto; and
    identifying one or more combinations of the knowledge entities.

8. The method of claim 7, wherein the step of identifying the one or more combinations of knowledge entities further comprises the step of identifying all combinations of all of the concept, instance and relationship knowledge entities.

9. The method of claim 1, wherein the reverse index is used in a search application.

10. The method of claim 1, wherein a keyword search is used in addition to the weightings of the knowledgebase triples to determine the one or more elements of content to best respond to the user search query;
    whereby the application achieves consistent performance as the number or size of graphs increases; and
    whereby the application is adapted to search universal content comprising one or more of keywords, partial triples, or full triples.

11. The method of claim 1, further comprising the steps of:
    identifying one or more operands in a search query being employed to search the content;
    splitting the operand into two equation parts; and
    storing a knowledge representation of each of the equation parts.

12. A non-transitory computer readable storage medium storing a computer program which when operated causes a general purpose computer to perform the steps of:
    converting content to one or more context knowledge graphs;
    creating a plurality of knowledgebase triples or entities selected from a group of Instance-Relation-Instance, Instance-Relation-Concept, Concept-Relation-Instance and Concept-Relation-Concept from the one or more context knowledge graphs;
    for each knowledgebase triple or entity, creating one or more knowledgebase variations thereof selected from the group of having from zero to three elements of the knowledgebase triple present, and including one or more endpoints as concepts or instances;
    storing the one or more knowledgebase variations as a knowledgebase representation of the content in a reverse index to a non-volatile computer readable storage medium;
    receiving a user search query;
    providing a weighting corresponding to a relevance between the user search query and one or more of the knowledgebase variations; and
    determining one or more elements of content to best respond to the user search query in accordance with the one or more weightings of the knowledgebase variations.

13. The non-transitory computer readable storage medium of claim 12, wherein the step of creating the plurality of knowledgebase triples further comprises the step of identifying at least one incomplete triple.

14. The non-transitory computer readable storage medium of claim 12, wherein the step of creating the plurality of knowledgebase triples further comprises the step of identifying at least one entity.

15. The non-transitory computer readable storage medium of claim 12, wherein the step of identifying the one or more knowledgebase variations for a particular one of the plurality of knowledgebase triples further comprises the steps of defining one or more combinations of knowledge entities comprising the particular one of the plurality of knowledgebase triples, each knowledge entity comprising one of an instance, a concept and a relation.

16. The non-transitory computer readable storage medium of claim 15, further comprising the steps of:
    for each combination of knowledge entities comprising an instance, abstracting one or more conceptual entities corresponding thereto; and
    identifying one or more combinations of the knowledge entities.

17. The non-transitory computer readable storage medium of claim 16, wherein the step of identifying the one or more combinations of knowledge entities further comprises the step of identifying all combinations of all of the concept, instance and relationship knowledge entities.

18. The non-transitory computer readable storage medium of claim 12, wherein a keyword search is used in addition to the weightings of the knowledgebase triples to determine the one or more elements of content to best respond to the user search query;

whereby the application achieves consistent performance as the number or size of graphs increases; and whereby the application is adapted to search universal content comprising one or more of keywords, partial triples, or full triples.

19. The non-transitory computer readable storage medium of claim 12, further comprising the steps of:

identifying one or more operands and one or more associated operators in a search query being employed to search the content;

splitting the one or more operands into two equation parts in accordance with the one or more associated operators;

storing a knowledge representation of each of the equation parts and a relationship there between in accordance with the one or more operands and one or more associated operators; and using the one or more operators and one or more associated operands while determining one or more elements of content to best respond to the user search query.

20. A system for indexing and searching content, comprising:

an input for receiving on or more content documents;

a processor for converting content to a plurality of context knowledge graphs, creating a plurality of knowledgebase triples or entities selected from a group of Instance-Relation-Instance, Instance-Relation-Concept, Concept-Relation-Instance and Concept-Relation-Concept from the one or more context knowledge graphs, and for each knowledgebase triple or entity, creating one or more knowledgebase variations thereof selected from the group of having from zero to three elements of the knowledgebase triple present, and including one or more endpoints as concepts or instances;

a nonvolatile computer storage medium for storing the one or more knowledgebase variations as a knowledgebase representation of the content in a reverse index; and an input for receiving a user search query;

the processor further determining a weighting corresponding to a relevance between the user search query and one or more of the knowledgebase variations, and further determining one or more elements of content to best respond to the user search query in accordance with the one or more weightings of the knowledgebase variations.

\* \* \* \* \*